United States Patent [19]

Hara et al.

[11] Patent Number: 4,893,056

[45] Date of Patent: Jan. 9, 1990

[54] FLUORESCENT DISPLAY APPARATUS

[75] Inventors: Zenichiro Hara, Nagasaki; Masaaki Kobayashi; Kazunori Tatsuda, both of Mie; Nobuo Terazaki; Shuji Iwata, both of Nagasaki, all of Japan

[73] Assignees: Mitsubishi Denki Kabushiki Kaisha, Chiyoda; Ise Electronics Corporation, Ise, both of Japan

[21] Appl. No.: 256,616

[22] Filed: Oct. 12, 1988

[30] Foreign Application Priority Data

Oct. 12, 1987 [JP] Japan ................................ 62-256610

[51] Int. Cl.[4] ................................................ H01S 29/74

[52] U.S. Cl. ...................................... 313/495; 313/497

[58] Field of Search ....................... 313/495, 497, 422; 315/169.4; 340/752, 781

[56] References Cited

U.S. PATENT DOCUMENTS 4,451,758 5/1984 Watanabe et al. .................. 313/495

FOREIGN PATENT DOCUMENTS 57-189452 11/1982 Japan .

58-133753 8/1983 Japan .

62-10849 1/1987 Japan .

*Primary Examiner*—Donald J. Yusko

*Assistant Examiner*—Sandra L. O'Shea

*Attorney, Agent, or Firm*—Burns, Doane, Swecker & Mathis

[57] ABSTRACT

Fluorescent display apparatus for use in a large-screen display comprising a display portion having fluorescent display portions arranged in a matrix and coated with fluorescent material for emitting light upon being bombarded by thermoelectrons, cathodes of the type consuming small power shaped in a linear form oriented in the direction of the row or column and disposed to oppose the display portion arranged that one cathode corresponds to two or four of the fluorescent display portions, a first control electrode in a planar form having openings made therein corresponding to the fluorescent display portions of the display portion and disposed between the display portion and the cathodes, second control electrodes disposed on the side of the cathodes opposite to the display portion, and arranged corresponding to each cathode along the length of the cathode, and third control electrodes disposed on both sides of the second control electrodes in the direction of the column, and arranged so as to correspond to each cathode.

6 Claims, 6 Drawing Sheets

FLUORESCENT DISPLAY APPARATUS

BACKGROUND OF THE INVENTION

1. Field of the Invention

The present invention relates to a fluorescent display apparatus constituting a large-screen display for use in a stadium or the like.

2. Description of the Prior Art

Large-screen displays are in use for displaying progress and result of sports events in such places as an outdoor stadium. A fluorescent display apparatus utilized in such a large-screen display is constructed of a large number of monochromatic illuminating tubes arranged in a matrix. FIG. 1 is a schematic diagram showing an internal arrangement of a prior art monochromatic illuminating tube.

The interior of the glass tube 1 is in a vacuum with air inside the tube evacuated through an exhaust hole 2. As a heater 3 heats up a cathode 4 surrounding the heater 3, thermoelectrons are emitted from the cathode 4. The thermoelectrons emitted from the cathode 4 is controlled in their flow by three types of grids 5, 6, 7 and allowed to bombard a fluorescent display portion 8 coated with fluorescent material. The fluorescent display portion 8 is applied with a high voltage and the part of the fluorescent display portion 8 bombarded by the thermoelectrons emits light. The grid 5 controls the quantity of the thermoelectrons emitted from the cathode 4, the grid 6 controls the diameter of the beam of the emitted thermoelectrons, and the grid 7 accelerates the emitted thermoelectrons. While potential for the grids 6, 7 is fixed, potential for the grid 5 is controlled, and thereby the quantity of the emitted thermoelectrons is controlled and the brightness of the fluorescent display portion 8 is regulated.

FIGS. 2 and 3 show a fluorescent display apparatus integrating a number of such monochromatic illuminating tubes therewith. On the apparatus, there are disposed the fluorescent display portions 8 of three primary colors, i.e., red (R), green (G), and blue (B) colors, suitably spaced apart in vertical and horizontal directions so as to be regularly distributed. Thus, with the potential of the grid 5 of each of the monochromatic illuminating tubes controlled, each of the fluorescent display portions 8 are controlled in their brightness and thereby a display is given with a desired color tone.

As a means to improve the resolution of such an apparatus provided with a number of monochromatic illuminating tubes, there is one using an illuminating tube being provided with a plurality of fluorescent display portions. However, since such an apparatus is of the structure that the cathode and grids must be provided for each of the fluorescent display portions, there are problems with it that the number of the component parts of the fluorescent display apparatus becomes larger, the internal structure becomes complex, and the power consumption becomes larger.

SUMMARY OF THE INVENTION

A primary object of the present invention is the provision of a fluorescent display apparatus having a simpler internal structure and consuming smaller power.

The fluorescent display apparatus according to the present invention uses cathodes in a linear form having a lower excitation voltage and consuming lower power, and besides, a single cathode is arranged to be commonly used for two or four, or further more fluorescent display portions. The apparatus is further provided with second control electrodes, one or two each thereof for one cathode, third control electrodes disposed on both sides of the second control electrodes, and a first control electrode shaped in a planar form with openings of the same number as the number of the fluorescent display portions made therein and disposed between the cathodes and the fluorescent display portions.

According to the fluorescent display apparatus of the present invention, first, thermoelectrons are emitted from each of the linear cathodes. The emitted thermoelectrons are controlled in their movements by the second and third control electrodes and are caused to bombard the fluorescent display portions through the openings in the first control electrode. Thus, the fluorescent display portions emit light individually controlled in their luminous intensity.

DETAILED DESCRIPTION OF THE PREFERRED EMBODIMENTS

Below will be described a fluorescent display apparatus having display portions arranged in a matrix of two rows by two columns as an embodiment according to the present invention with reference to the accompanying drawings.

Figure 1:
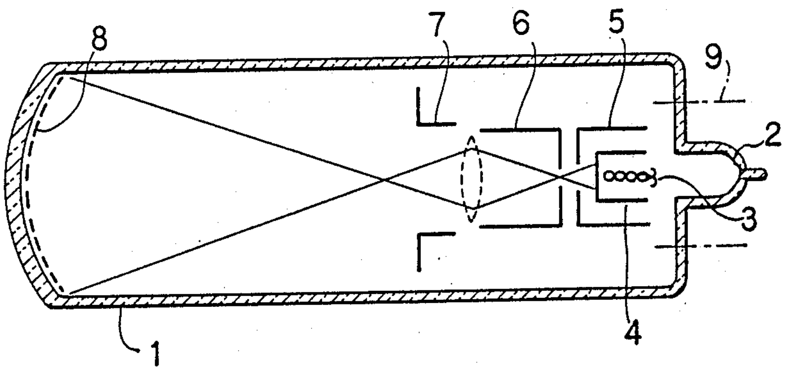
FIG. 1 (PRIOR ART)
FIG. 1 is a schematic diagram showing internal structure of a prior art monochromatic illuminating tube.
Figure 2:
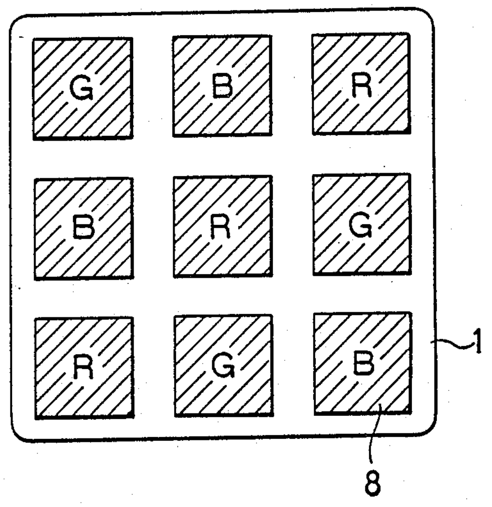
FIG. 2 (PRIOR ART)
FIG. 2 is a top view of a prior art fluorescent display apparatus.
Figure 3:
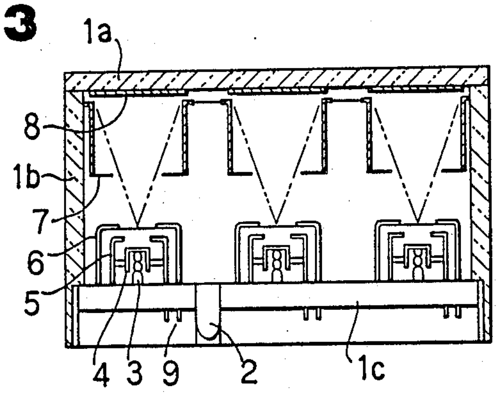
FIG. 3 (PRIOR ART)
FIG. 3 is a side view in section of the same.
Figure 4:
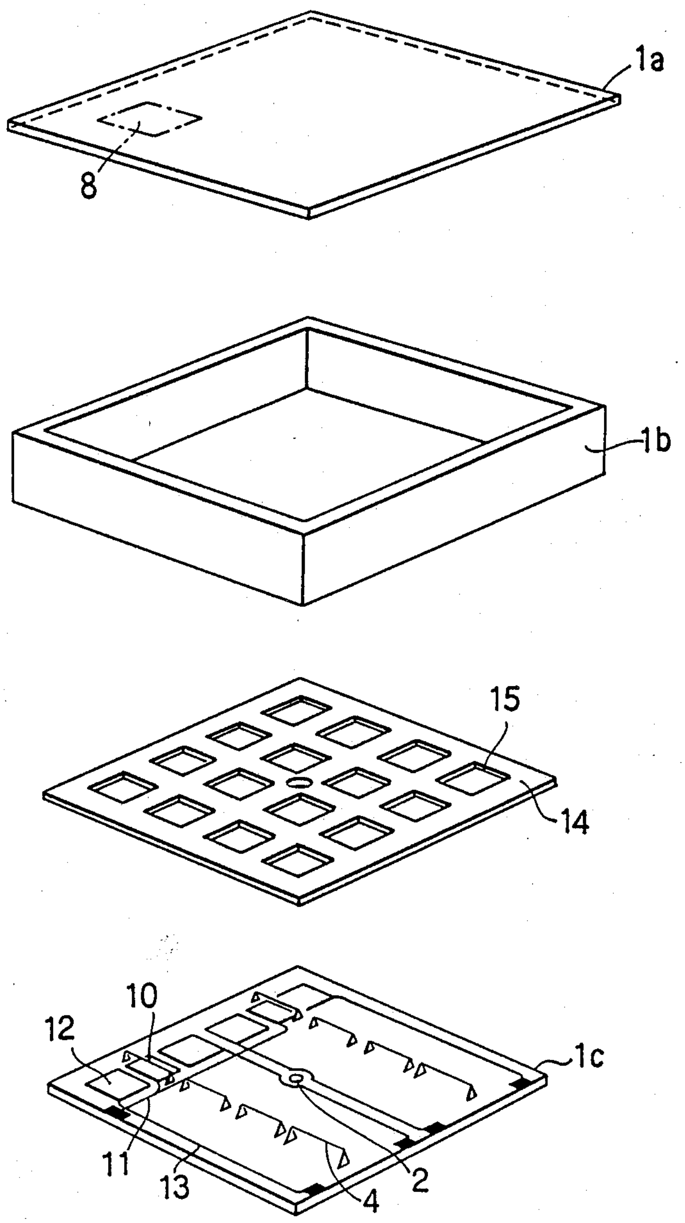
FIG. 4 is an exploded view in perspective showing component parts of an embodiment of the present invention.

FIG. 4 is an exploded view in perspective showing component parts of an embodiment of a fluorescent display apparatus according to the present invention. Referring to the figure, **1*a* denotes a display portion in a planar form having 16 fluorescent display portions 8, 1*b* denotes a frame member constituting the side walls of the fluorescent display apparatus, 14 denotes a planar electrode as a first control electrode having 16 openings 15 made therein, and 1*c* denotes a substrate with cathodes 4, second and third control electrodes 10, 12, wiring electrodes 11, 13 therefor and the like formed thereon. The fluorescent display apparatus is assembled by having a planar electrode 14 disposed in the space surrounded by the frame member 1*b*, attaching the display portion 1*a* to one side of the frame member 1*b*, and attaching the substrate 1*c* to the other side of the frame member 1*b***.

The display portion 1a has 16 fluorescent display portions 8 arranged in a matrix (four rows by four columns) and coated with fluorescent material. Each fluorescent display portion 8 is applied with a high voltage and emits light when bombarded by thermoelectrons. The planar electrode 14 is provided with 16 openings 15 made therein, arranged in a matrix (four rows by four columns), at the positions corresponding to their respective fluorescent display portions 8.

Figure 5:
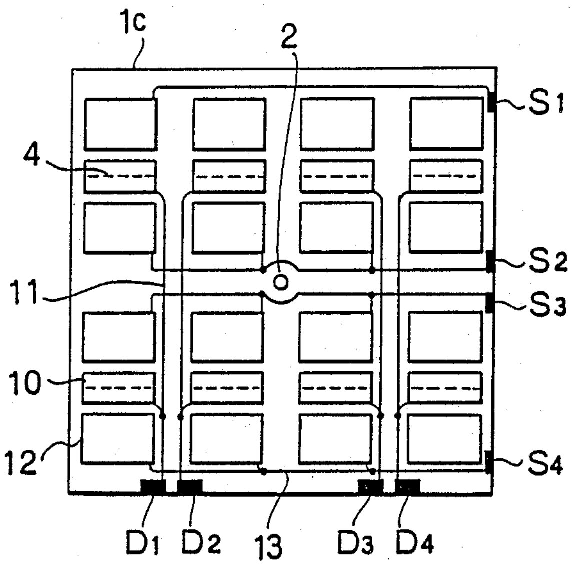
FIG. 5 is a plan view showing electrode structure.

FIG. 5 is a plan view showing the electrode arrangement on the substrate 1c, in which the horizontal direction corresponds to the direction of the row and the vertical direction corresponds to the direction of the column. In the center of the substrate 1c, there is formed an exhaust hole 2 as the passage for evacuating air from the interior of the fluorescent display apparatus. There are provided eight directly heated, linear cathodes 4 disposed slightly separated from the surface of the substrate 1c. As each cathode 4 is heated by electric current passed therethrough, thermoelectrons are emitted from the cathode 4. At the portions on the surface of the substrate 1c opposing each of the cathodes 4, there are formed eight data electrodes 10 as second control electrodes for controlling the emission of the thermoelectrons from the cathodes 4 in an array of two rows by four columns. Each data electrode 10 controls the emission of the thermoelectrons from each of the corresponding cathodes 4 by being applied with a positive or negative potential relative to the potential of the cathode 4. On the surface of the substrate 1c and at both sides of each of the data electrodes 10 in the direction of the column, there are formed 16 scanning electrodes 12 as third control electrodes for controlling the advancing direction of the thermoelectrons emitted from the cathode 4 arranged in a matrix of four rows by four columns. The data electrode 10 has smaller surface area than the scanning electrode 12. Of the eight data electrodes 10, two each arranged in the direction of the column are connected to each of four wiring electrodes 11 arranged in the direction of the column. Of the 16 scanning electrodes 12, four each arranged in the direction of the row are connected to each of four wiring electrodes 13 crossing the wiring electrodes 11 at right angles, or arranged in the direction of the row. The wiring electrodes 11 and the wiring electrodes 13 are arranged so as not to contact each other through an insulating layer. And, these data electrodes 10, scanning electrodes 12, wiring electrodes 11, and wiring electrodes 13 are printed on the surface of the substrate 1c.

Figure 6:
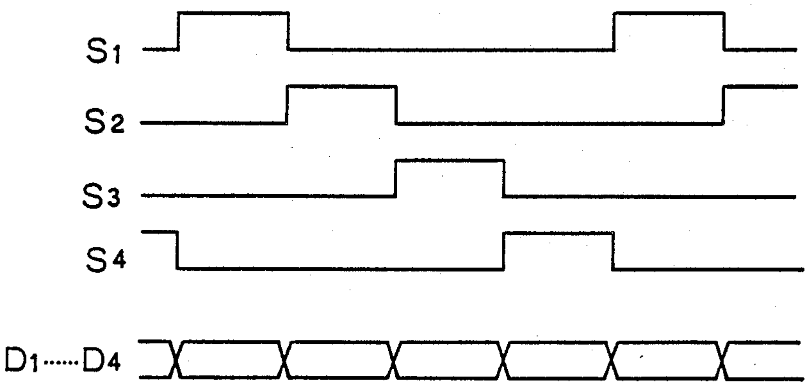
FIG. 6 is a timing chart schematically showing timing of signals.
Figure 7:
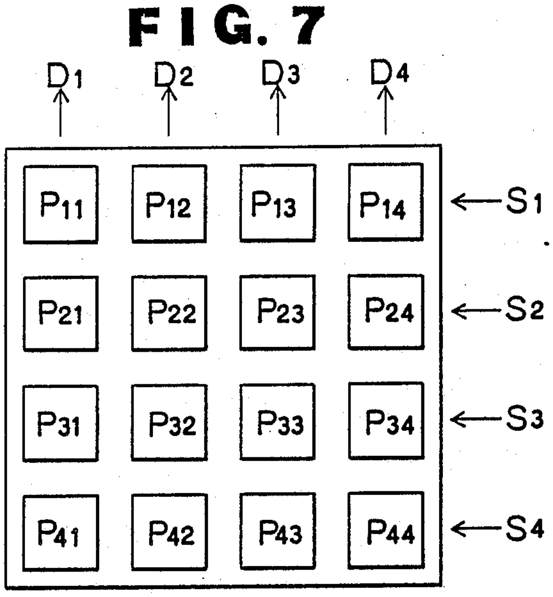
FIG. 7 is a schematic plan view showing a display portion.

Below will be described operation of the apparatus. Referring to FIG. 5, $S_1$, $S_2$, $S_3$, and $S_4$ denote scanning signals to be applied, respectively, to four scanning electrodes 12 each in the direction of the row, while $D_1$, $D_2$, $D_3$ and $D_4$ denote data signals to be applied, respectively, to four data electrodes 10 each in the direction of the column. FIG. 6 is for showing timing of application of these signals $S_1$–$S_4$ and $D_1$–$D_4$. And, FIG. 7 is for showing the arrangement of the fluorescent display portions 8 formed in a matrix on the display portion 1a, wherein the fluorescent display portions 8 are controlled in their emission of light by the control of the signals $S_1$–$S_4$ and $D_1$–$D_4$.

The operation for controlling the emission of light will be described below.

Figure 8:
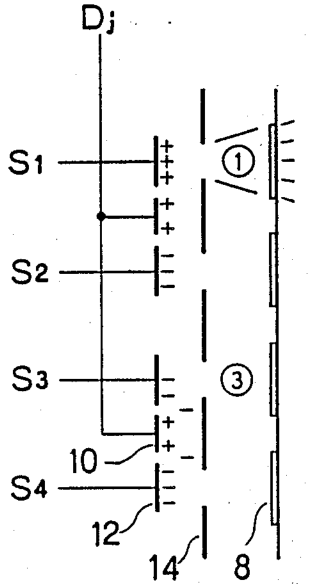
FIGS. 8 and 9 are schematic diagrams showing state of potential in the vicinity of cathodes.
Figure 9:
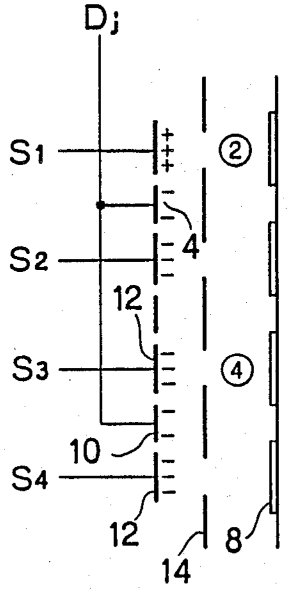

ON (positive) or OFF (negative) state of each of the data electrodes 10 and ON (positive) or OFF (negative) state of each of the scanning electrodes 12 are controlled by the timing of application of the data signals and the scanning signals. With regard to the ON or OFF state of the scanning electrode 12 and the ON or OFF state of the data electrode 10, there are four cases: the case where both the scanning electrode 12 and the data electrode 10 are in the ON state, where the scanning electrode 12 is in the ON state and the data electrode 10 is in the OFF state, where the scanning electrode 12 is in the OFF state and the data electrode 10 is in the ON state, and where both the scanning electrode 12 and the data electrode 10 are in the OFF state. The condition of emission of light by the fluorescent display portion 8 in each case will be described below. FIGS. 8 and 9 are schematic diagrams showing states of potential in these four cases.

① Where both the scanning electrode 12 and the data electrode 10 are in the ON state:

The electric field in the vicinity of the heated cathode 4 becomes positive on account of the electric field of the data electrode 10 and the scanning electrode 12 and hence thermoelectrons are emitted. The emitted thermoelectrons are deflected by the electric field of the scanning electrode 12 and accelerated by the planar electrode 14 to advance to the corresponding fluorescent display portion 8 and bombard the fluorescent display portion 8. Then, the thermoelectrons coming into contact with the fluorescent material causes the fluorescent display portion 8 to emit light (FIG. 8 ①).

② Where the scanning electrode 12 is in the ON state and the data electrode 10 is in the OFF state:

Since the data electrode 10 is formed closer to the cathode 4, the electric field of the data electrode 10 affects the cathode 4 more strongly. Hence, in this case, the electric field in the vicinity of the cathode 4 becomes negative so that the emission of the thermoelectrons from the cathode 4 is restrained and the fluorescent display portion 8 does not emit light (FIG. 9 ②).

③ Where the scanning electrode 12 is in the OFF state and the data electrode 10 is in the ON state:

Although the data electrode 10 is positive, both the scanning electrodes 12 formed on both sides of the data electrode 10 are negative, and moreover, the scanning electrode 12 is larger in surface area than the data electrode 10, and hence the electric field in the vicinity of the cathode 4 becomes negative so that the emission of the thermoelectrons from the cathode 4 is restrained and the fluorescent display portion 8 does not emit light (FIG. 8 ③).

④ Where both the scanning electrode 12 and the data electrode 10 are in the OFF state:

The electric field in the vicinity of the cathode 4 becomes negative so that the emission of the thermoelectrons from the cathode 4 is restrained and the fluorescent display portion 8 does not emit light (FIG. 9 ④).

In the described manner, the emission of light by each of the fluorescent display portions 8 is controlled at will by combination of the potential of the data electrode 10 and the scanning electrode 12. Since, here, the potential of the data electrode 10 and the scanning electrode 12 is controlled by the data signals $D_1$–$D_4$ and the scanning signals $S_1$–$S_4$, it is enabled to have each of the fluorescent display portions 8 emitting light or not at will by the control of these signals.

The relationship in concrete terms between the control of signals and the control of light emission in each of the fluorescent display portions 8 will now be described according to FIG. 7. First, when the scanning signal $S_1$ is ON, fluorescent display portions $P_{11}$–$P_{14}$ are selected, and according to ON/OFF states of the data signals $D_1$–$D_4$, the corresponding fluorescent display portions 8 are chosen whether or not to emit light. Then, upon turning ON of the signal $S_2$, the fluorescent display portions $P_{21}$–$P_{24}$ are selected and, according to ON/OFF states of the data signals $D_1$–$D_4$, similarly to the above, the corresponding fluorescent display portions 8 are chosen whether or not to emit light. Upon turning ON of the signals $S_3$, $S_4$, similarly to the above, corresponding fluorescent display portions 8 according to ON/OFF states of the data signals $D_1$–$D_4$ are chosen whether or not to emit light. Thus, by the application of the timing signals as shown in FIG. 6, the conditions of the fluorescent display portions 8 whether or not to emit light can be controlled at will.

By the construction and the control of the fluorescent display apparatus described above, the number of the cathodes can decrease by half and the power consumption can also be made smaller as compared with the prior art fluorescent display apparatus.

Figure 10:
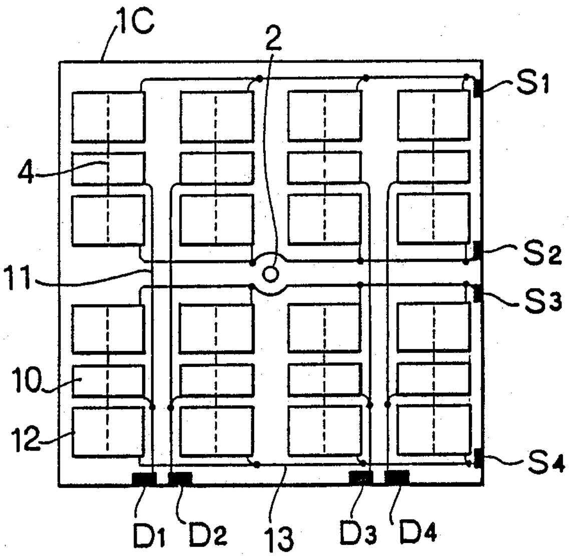
FIG. 10 is a plan view showing electrode structure of another embodiment of the present invention.

FIG. 10 is another embodiment of the present invention wherein the cathodes are arranged in the column direction. Thus arrangement, as the cathode length is longer than that in FIG. 4 wherein the cathodes are arranged in the row direction, the emission efficiency of the thermoelectrons is better and the power consumption can furthermore decrease.

Figure 11:
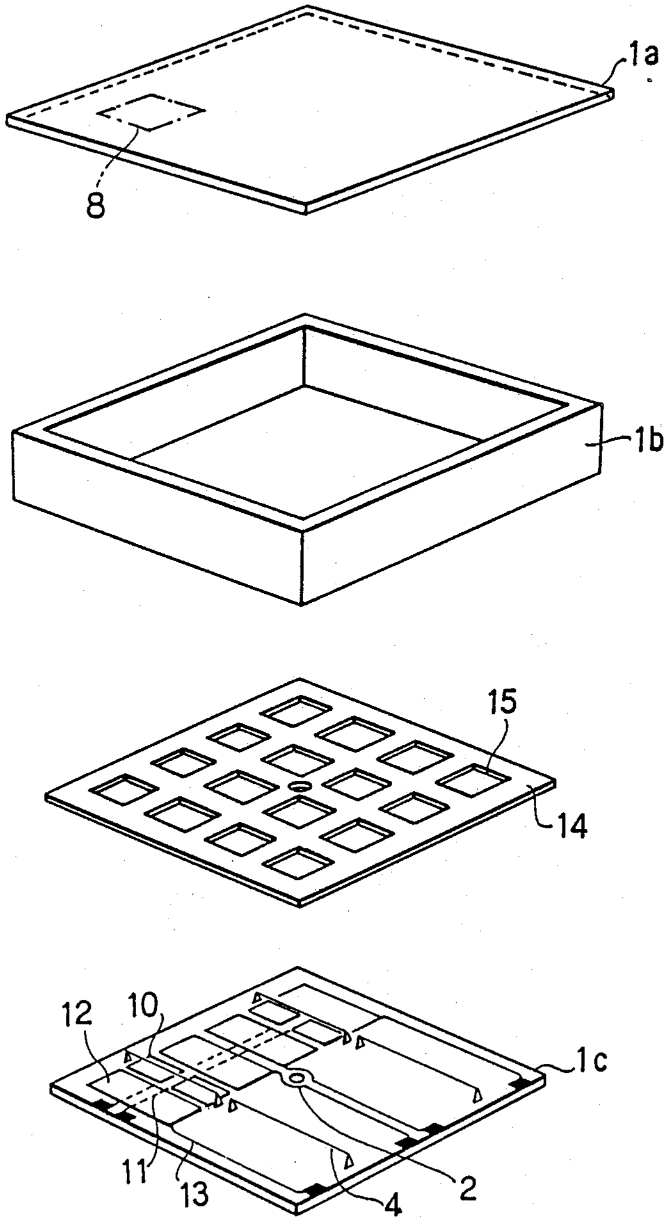
FIG. 11 is an exploded view in perspective showing component parts of still other embodiment of the present invention.
Figure 12:
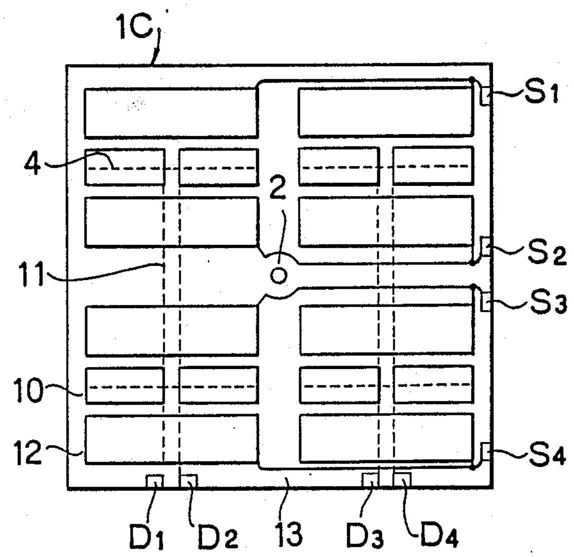
FIG. 12 is a plan view showing electrode structure of the embodiment of FIG. 11.

FIGS. 11 and 12 are still other embodiment of the fluorescent display apparatus of the present invention having display portions which are arranged in four rows by four columns.

FIG. 11 is a plan view showing the electrode arrangement on the substrate 1*c*, in which the horizontal direction corresponds to the direction of the row and the vertical direction corresponds to the direction of the column. In the center of the substrate 1*c*, there is formed an exhaust hole 2 as the passage for evacuating air from the interior of the fluorescent display apparatus. There are provided four directly heated, linear cathodes 4 disposed slightly separated from the surface of the substrate 1*c*. As each cathode 4 is heated by electric current passed therethrough, thermoelectrons are emitted from the cathode 4. At the portions on the surface of the substrate 1*c* opposing each of the cathodes 4, there are formed eight data electrodes 10 as second control electrodes for controlling the emission of the thermoelectrons from the cathodes 4 in an array of two rows by four columns. Each data electrode 10 controls the emission of the thermoelectrons from each of the corresponding cathodes 4 by being applied with a positive or negative potential relative to the potential of the cathode 4. On the surface of the substrate 1*c* and at both sides of each of the data electrodes 10 in the direction of the column, there are formed eight scanning electrodes 12 as third control electrodes for controlling the advancing direction of the thermoelectrons emitted from the cathode 4 arranged in a matrix of four rows by two columns. The data electrode 10 has smaller surface area than the scanning electrode 12. Of the eight data electrodes 10, two each arranged in the direction of the column are connected to each of four wiring electrodes 11 arranged in the direction of the column. Of the eight scanning electrodes 12, two each arranged in the direction of the row are connected to each of four wiring electrodes 13 crossing the wiring electrodes 11 at right angles, or arranged in the direction of the row. The wiring electrodes 11 and the wiring electrodes 13 are arranged so as not to contact each other through an insulating layer. And, these data electrodes 10, scanning electrodes 12, wiring electrodes 11, and wiring electrodes 13 are printed on the surface of the substrate 1*c*.

The operation of the fluorescent display apparatus thus constructed is the same as that of FIG. 4. By the above construction of the fluorescent display apparatus, the number of the cathode can decrease by quarter and the power consumption can also be made smaller as compared with the prior art fluorescent display apparatus.

According to the present invention, the control electrodes are arranged in a matrix, light emitting conditions of the fluorescent display portions 8 are controlled for each row by the scanning signal, and the light emitting conditions of the fluorescent display portions 8 for each column are controlled by the data signal, and therefore, the peripheral circuits for the control electrodes can be made smaller in number as compared with the prior art fluorescent display apparatus wherein the fluorescent display portions 8 are individually controlled for emitting light.

Further, the data electrodes, scanning electrodes, and wiring electrodes for these electrodes are formed on the same surface by printing, and hence the internal structure can be made simpler.

Although the present embodiment was described above as to its case where four rows by four columns, but these are not limitative. Even if more numbers of row and column are used, similar arrangement as above can of course be realized.

According to the present invention as described above in detail, cathodes in a linear form are used as the cathodes, and besides, a single cathode is arranged to be commonly used for two or four, or further more fluorescent display portions, and hence the power consumption can be kept lower.

Further, since the number of peripheral circuits of the control electrodes is reduced on account of the arrangement that emission of light by the fluorescent display portions arranged in a matrix is controlled for each row and each column, the effect is obtained that the internal structure of the fluorescent display apparatus can be made simpler.

What is claimed is:

1. In a fluorescent display apparatus consisting of a vacuum chamber containing cathodes for emitting thermoelectrons, control electrodes for controlling the flow of the emitted thermoelectrons, and a display portion formed of a plurality of fluorescent display portions coated with fluorescent material and emitting light upon being bombarded by the thermoelectrons, said fluorescent display apparatus wherein said display portion is formed of said fluorescent display portions arranged in a matrix of 2 m rows by n columns (m, n are natural numbers), said cathodes are made up of cathodes in a linear form oriented in the direction of the row or column and disposed to oppose said display portion arranged in an array of m rows by n columns so that one each thereof corresponds to two of said fluorescent display portions, and said control electrodes are made up of a first control electrode in a planar form disposed between said display portion and said cathodes and having openings made therein corresponding to said fluorescent display portions of said display portion, second control electrodes disposed on the side of said cathodes opposite to said display portion and arranged in an array of m rows by n columns so that each thereof are disposed corresponding to each said cathode, and third control electrodes disposed on both sides of said second control electrodes in the direction of the column arranged in an array of 2 m rows by n columns.

2. The fluorescent display apparatus according to claim 1, wherein said second and third control electrodes and wiring therefor are all formed on the same surface by printing.

3. The fluorescent display apparatus according to claims 1 or 2, wherein groups of said second control electrodes for each column are connected to 2 n signal lines, while groups of said third control electrodes for each row are connected to 2 m signal lines crossing said signal lines at right angles.

4. In a fluorescent display apparatus consisting of a vacuum chamber containing cathodes for emitting thermoelectrons, control electrodes for controlling the flow of the emitted thermoelectrons, and a display portion formed of a plurality of fluorescent display portions coated with fluorescent material and emitting light upon being bombarded by the thermoelectrons, said fluorescent display apparatus wherein said display portion is formed of said fluorescent display portions arranged in a matrix of 2 m rows by 2 n columns (m, n are natural numbers), said cathodes are made up of cathodes in a linear form oriented in the direction of the row and disposed to oppose said display portion arranged in an array of m rows by n columns so that one each thereof corresponds to four of said fluorescent display portions, and said control electrodes are made up of a first control electrode in a planar form disposed between said display portion and said cathodes and having 2 m×2 n openings made therein corresponding to said fluorescent display portions of said display portion, second control electrodes disposed on the side of said cathodes opposite to said display portion and arranged in an array of m rows by 2 n columns so that two each thereof are disposed corresponding to each said cathode along the length of the cathode, and third control electrodes disposed, corresponding to each said cathode, on both sides of said two second control electrodes in the direction of the column arranged in an array of 2 m rows by n columns.

5. The fluorescent display apparatus according to claim 4, wherein said second and third control electrodes and wiring therefor are all formed on the same surface by printing.

6. The fluorescent display apparatus according to claims 4 or 5, wherein groups of said second control electrodes for each column are connected to 2 n signal lines, while groups of said third control electrodes for each row are connected to 2 m signal lines crossing said 2 n signal lines at right angles.

* * * * *